(12) United States Patent
Gamble et al.

(10) Patent No.: US 12,715,626 B2
(45) Date of Patent: Aug. 25, 2026

(54) HELIX TILT DEVICE FOR TILTING COAXIAL PROPULSION SYSTEM

(71) Applicant: Lockheed Martin Corporation, Bethesda, MD (US)

(72) Inventors: Dustin Eli Gamble, San Luis Obispo, CA (US); Terrance James Elliott Storey, San Luis Obispo, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 127 days.

(21) Appl. No.: 18/658,613

(22) Filed: May 8, 2024

(65) Prior Publication Data

US 2026/0021912 A1 Jan. 22, 2026

(51) Int. Cl.
*B64U 30/297* (2023.01)
*B64U 10/20* (2023.01)
*B64U 40/10* (2023.01)

(52) U.S. Cl.
CPC ........... *B64U 30/297* (2023.01); *B64U 10/20* (2023.01); *B64U 40/10* (2023.01)

(58) Field of Classification Search
CPC ....... B64U 30/297; B64U 10/20; B64U 40/10
See application file for complete search history.

(56) References Cited

U.S. PATENT DOCUMENTS 2,052,454 A 8/1936 Isaac et al.
3,092,186 A 6/1963 MacLean
3,957,227 A 5/1976 Baskin
6,761,533 B2 7/2004 Favaro
9,523,278 B2 12/2016 Foskey et al.
9,694,900 B2 7/2017 Buttolph
10,988,249 B1 * 4/2021 Sinha .................... B64D 27/34
11,760,475 B2 9/2023 Ivans et al.
2021/0316847 A1 * 10/2021 Predonu ................ B64U 10/20

FOREIGN PATENT DOCUMENTS

CN 213921460 U 8/2021
FR 1435382 A 4/1966

OTHER PUBLICATIONS

1 Communication with European search report, mailed Sep. 10, 2025, Application No. EP25174024, 10 pages.

* cited by examiner

*Primary Examiner* — Kimberly S Berona
*Assistant Examiner* — Steven J Shur
(74) *Attorney, Agent, or Firm* — Baker Botts L.L.P.

(57) ABSTRACT

Systems and methods include a tilt device for an aircraft vehicle. The tilt device is configured to rotate a rotor assembly between first and second positions. The tilt device comprises a linear actuator disposed within an aircraft fairing; a sleeve having a slot defined therein; and a piston coupled to the linear actuator configured to translate axially within the sleeve. A method includes actuating the linear actuator to translate the piston, wherein the rotor assembly is coupled to an end of the piston and comprises a motor and one or more rotor blades. The method further includes rotating the piston within the sleeve as the piston translates axially along the sleeve via a pin disposed within a slot defined in the sleeve, wherein the pin extends from the piston and through the slot. The method further includes actuating the motor to operate the one or more rotor blades.

9 Claims, 3 Drawing Sheets

HELIX TILT DEVICE FOR TILTING COAXIAL PROPULSION SYSTEM

TECHNICAL FIELD

This disclosure generally relates to unmanned aircraft, and more specifically to a helix tilt device for tilting a coaxal propulsion system.

BACKGROUND

Rotor assemblies can be used to provide lift and thrust for unmanned aircraft. The rotor blades of a rotor assembly can be positioned initially to provide the lift and then can be moved to provide the thrust. This transition provides instability to the unmanned aircraft as the force vector transitions from a vertical direction to a horizontal direction. Rotating the rotor assembly can change the center of gravity of the aircraft. Further, for an odd number of assemblies, an unbalanced torque in the yaw axis will be induced, requiring a constant amount of input from the flight control system to maintain stability. There is a need for an improved tilting device for the rotor assemblies.

SUMMARY

According to one embodiment, an aircraft vehicle may include a body and at least one wing coupled to the body. The aircraft vehicle may also include an aircraft fairing extending from the body and a first rotor assembly disposed at a first end of the aircraft fairing. The aircraft vehicle may also include a tilt device configured to rotate the first rotor assembly between a first position and a second position. The tilt device may include a linear actuator disposed within the aircraft fairing and a sleeve having a slot defined therein. The tilt device may also include a piston coupled to the linear actuator configured to translate axially within the sleeve.

According to another embodiment, a method for actuating a rotor assembly may include actuating a linear actuator to translate a piston within a sleeve from a first position to a second position, wherein the piston is coupled to the linear actuator, wherein the rotor assembly is coupled to an end of the piston and comprises a motor and one or more rotor blades. The method may also include rotating the piston within the sleeve as the piston translates axially along the sleeve via a pin disposed within a slot defined in the sleeve, wherein the pin extends from the piston and through the slot. The method may also include actuating the motor to operate the one or more rotor blades.

According to another embodiment, a non-transitory computer-readable medium storing instructions that when executed by a processor, may cause the processor to actuate a linear actuator to translate a piston within a sleeve from a first position to a second position, wherein the piston is coupled to the linear actuator, wherein the piston is configured to rotate as the piston translates axially along the sleeve via a pin disposed within a slot defined in the sleeve, wherein the pin extends from the piston and through the slot, and wherein a rotor assembly is coupled to an end of the piston and is configured to move concurrently with the piston. The instructions may also cause the processor to actuate the rotor assembly to operate one or more rotor blades.

BRIEF DESCRIPTION OF THE DRAWINGS

To assist in understanding the present disclosure, reference is now made to the following description taken in conjunction with the accompanying drawings, in which.

DETAILED DESCRIPTION

Figure 1:
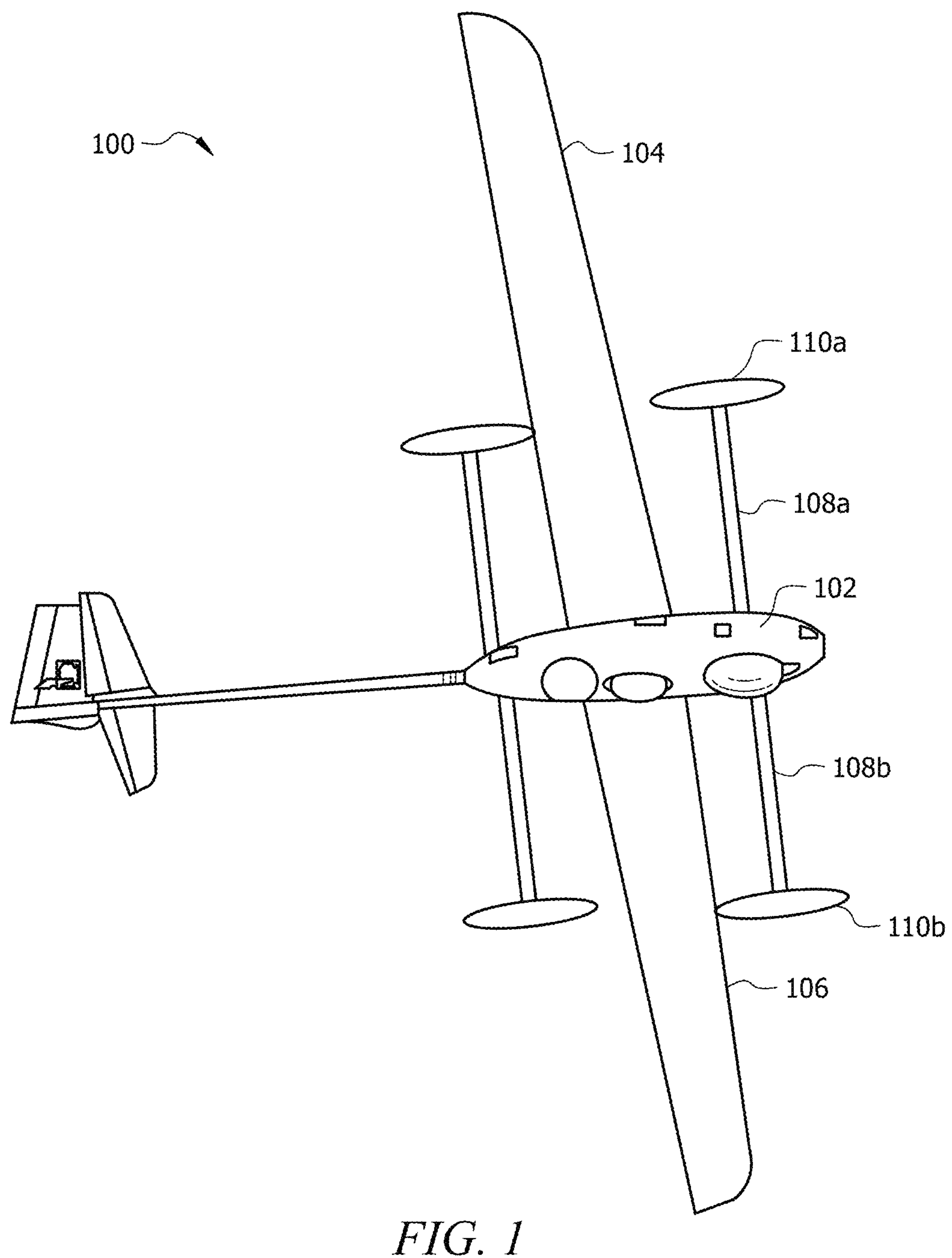
FIG. 1 illustrates an example vehicle, according to certain embodiments.

Illustrative embodiments of the present disclosure are described in detail herein. In the interest of clarity, not all features of an actual implementation may be described in this specification. It will of course be appreciated that in the development of any such actual embodiment, numerous implementation specific decisions may be made to achieve the specific implementation goals, which may vary from one implementation to another. Moreover, it will be appreciated that such a development effort might be complex and time consuming but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "la" refers to an instance of a widget class, which may be referred to collectively as widgets "1" and any one of which may be referred to generically as a widget "1". In the figures and the description, like numerals are intended to represent like elements.

The terms "couple" or "couples," as used herein, are intended to mean either an indirect or direct connection. Thus, if a first device couples to a second device, that connection may be through a direct connection, or through an indirect electrical connection or a shaft coupling via other devices and connections.

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 4, where like numbers are used to indicate like and corresponding parts. Described herein are various systems and methods that provide rotation to a propulsion system (i.e., rotor assembly) of an unmanned aircraft.

FIG. 1 illustrates an example vehicle 100. Vehicle 100 may be any suitable vessel configured for transportation, such as an aircraft. In embodiments, the vehicle 100 may be an unmanned aircraft powered by electricity and/or any other suitable power source. Vehicle 100 may include a body 102 (for example, a fuselage), a first wing 104, and a second wing 106. As illustrated, both the first wing 104 and the second wing 106 may be coupled to the body 102, wherein the first wing 104 may be disposed opposite to the second wing 106. The first wing 104 and the second wing 106 may extend laterally away from the body 102 and may be configured to generate lift for the vehicle 100. The vehicle 100 may be any suitable size, height, shape, and any combinations thereof. In embodiments, the body 102 may be cylindrical, and the first wing 104 and the second wing 106 may generally be rectangular. As shown, the vehicle 100 may further comprise an aircraft fairing 108.

The aircraft fairing 108 may be any suitable size, height, shape, and any combinations thereof. The aircraft fairing 108 may be a structural component operable to secure a rotor assembly 110 to the vehicle 100. As illustrated, the aircraft fairing 108 may extend outwards from the body 102 generally in the same direction as the first wing 104 or second wing 106. In embodiments, there may be a plurality of aircraft fairings 108 extending from the body 102, wherein each one individually couples an additional rotor assembly 110 to the body 102. For example, a first aircraft fairing **108*a* may extend outwards in one direction securing a first rotor assembly 110*a* to the body, and a second aircraft fairing 108*b* may extend in an opposite direction securing a second rotor assembly 110*b* to the body 102. The vehicle 100 is not limited to such a number and may include any suitable number of additional aircraft fairings 108 and rotor assemblies 110**.

In embodiments, the rotor assembly 110 may be disposed and/or secured at an end of the aircraft fairing 108. Without limitations, the rotor assembly 110 may be secured to the aircraft fairing 108 through any suitable means, including through the usage of fasteners, welding, adhesives, interlocking components, interference fit, and combinations thereof. In embodiments, suitable fasteners may include studs, bolts, nuts, washers, screws, nails, rivets, brackets, clamps, and the like. The rotor assembly 110 may be configured to provide lift, thrust, and a combination thereof for the vehicle 100 The rotor assembly 110 may be configured to receive power from a power source (i.e., one or more batteries) located within the body 102 in order to operate.

Figures 2A, 2B:
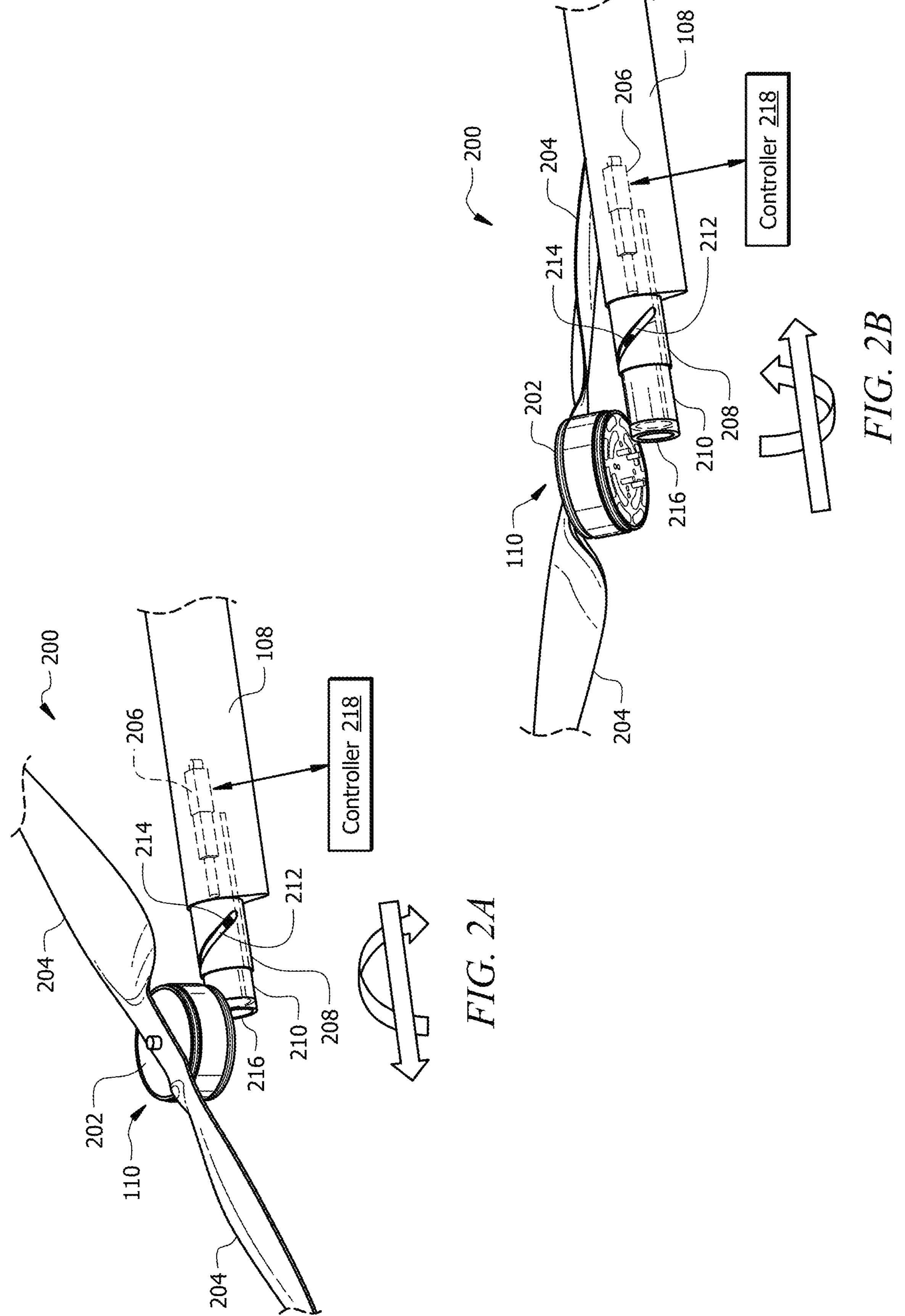
FIGS. 2A and 2B illustrate an example tilt device, according to certain embodiments.

FIGS. 2A and 2B illustrate an example tilt device 200. Tilt device 200 may be configured to change a position of the rotor assembly 110. For example, the rotor assembly 110 may be configured to provide lift for the vehicle 100 (referring to FIG. 1) in a first position. To provide thrust to the vehicle 100, the rotor assembly 100 may be required to adjust positions from the first position to a second position. In embodiments, the rotor assembly 110 may comprise a motor 202 and one or more rotor blades 204. The motor 202 may be configured to produce mechanical energy used to actuate the one or more rotor blades 204 to rotate at a given speed. Without limitations, any suitable motor may be used as the motor 202. In other embodiments, a different prime mover may be used as the motor 202, such as an engine. The one or more rotor blades 204 may be any suitable size, height, shape, and any combinations thereof. The one or more rotor blades 204 may be configured to produce a force vector that operates on the vehicle 100 to transport the vehicle 100.

In one or more embodiments, the one or more rotor blades 204 of the rotor assembly 110 may extend outwards in a direction parallel to a horizontal axis when in the first position. During operations, the rotor assembly 110 may be actuated by the tilt device 200 to rotate to place the rotor assembly 110 in the second position, wherein the one or more rotor blades 204 extend outwards in a direction perpendicular to the horizontal axis. Without limitations, the tilt device 200 may be configured to rotate the rotor assembly about 90°.

The tilt device 200 may comprise a linear actuator 206, a sleeve 208, and a piston 210. The linear actuator 206 may be disposed within the aircraft fairing 108. Without limitations, any suitable linear actuator may be used as the linear actuator 206. For example, a high-torque ball screw type of actuator may be used as the linear actuator 206. The linear actuator 206 may be configured to provide linear motion and may extend and retract. The sleeve 208 may be disposed adjacent to the end of the aircraft fairing 108. In embodiments, the sleeve 208 may be secured to the end of the aircraft fairing 108 through any suitable means. The sleeve 208 may be any suitable size, height, shape, and any combinations thereof. In embodiments, the sleeve 208 may generally be cylindrical in shape and may have a central bore allowing passage therethrough. The piston 210 may be coupled to the linear actuator 206 and may be disposed at least partially within the sleeve 208. In embodiments, the piston 210 may be configured to rotate relative to the linear actuator 206 and may be coupled to the linear actuator 206 via a suitable rotating joint (not shown). The linear actuator 206 may be configured to translate the piston 210 axially through the sleeve 208.

As illustrated, a slot 212 may be defined in the sleeve 208. The slot 212 may be any suitable size and/or shape. For example, the slot 212 may comprise a helical shape in view of the sleeve 208. The slot 212 may be configured to receive a pin 214 extending from an outer surface of the piston 210, wherein the pin 214 may extend through the slot 212 of the sleeve 208. In embodiments, movement of the pin 214 may be constrained by the shape of the slot 212. The configuration of the slot 212 and pin 214 may provide rotation to the piston 210 as the linear actuator 206 translates the piston 210 axially within the sleeve 208. In embodiments, a mount 216 may be disposed at the end of the piston 210 and may be configured to secure the rotor assembly 110 to the piston 210. The mount 216 may be any suitable size, height, shape, an any combination thereof. Further, the mount 216 may secure the rotor assembly 110 to the piston 210 through any suitable means, including through the usage of fasteners, welding, adhesives, interlocking components, interference fit, and any combination thereof. In certain embodiments, the mount 216 may be configured to secure two rotor assemblies 110 (not shown) to the end of the piston 210. The rotor assembly 110 may be configured to move concurrently with the piston 210. As such, tilt device 200 may be configured to rotate the rotor assembly 110 through movement of the piston 210. In operations, as the piston 210 is actuated to translate within the sleeve 208, the pin 214 may move along the slot 212 generally in the same direction. As the pin 214 is fixed to the piston 210, the displacement of the pin 214 in a lateral direction may force the piston 210, and the rotor assembly 110, to rotate.

In embodiments, a controller 218 (discussed further below) may be configured to actuate the tilt device 200. The controller 218 may be communicatively coupled to the linear actuator 200, such as through a wired or wireless connection. The controller 218 may transmit and receive signals, such as instructions to the tilt device 200 and/or measurements relative to operation of the tilt device 200.

Figure 3:
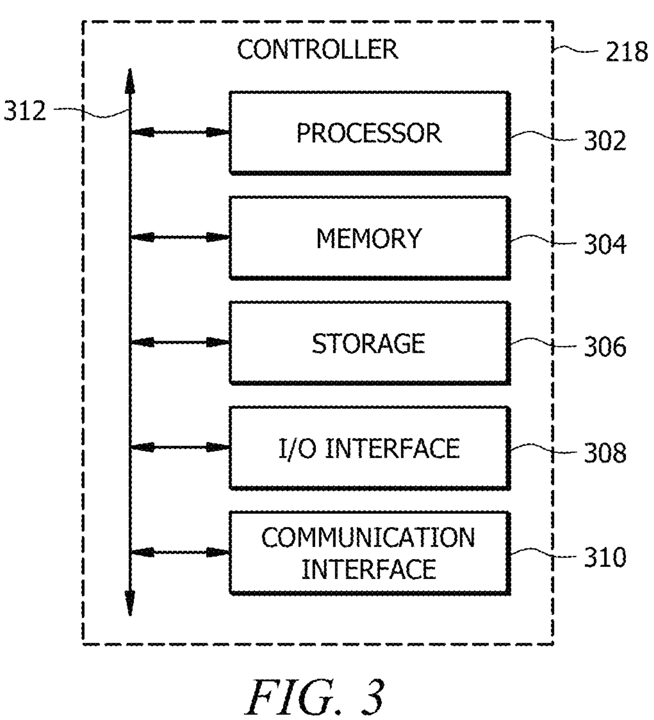
FIG. 3 illustrates an example controller, according to certain embodiments.

FIG. 3 illustrates the controller 218 of the vehicle 100 (referring to FIG. 1), in accordance with certain embodiments. In particular embodiments, one or more controllers 218 perform one or more steps of one or more methods described or illustrated herein. In particular embodiments, one or more controllers 218 provide functionality described or illustrated herein. In particular embodiments, software running on one or more controllers 218 performs one or more steps of one or more methods described or illustrated herein or provides functionality described or illustrated herein. Particular embodiments include one or more portions of one or more controllers 218. Herein, reference to a controller may encompass a computing device, and vice versa, where appropriate. Moreover, reference to a controller may encompass one or more controllers, where appropriate.

This disclosure contemplates any suitable number of controllers 218. This disclosure contemplates controller 218 taking any suitable physical form. As example and not by way of limitation, controller 218 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, controller 218 may include one or more controllers 218; be unitary or distributed; span multiple locations; span multiple machines; span multiple data centers; or reside in a cloud, which may include one or more cloud components in one or more networks. Where appropriate, one or more controllers 218 may perform without substantial spatial or temporal limitation one or more steps of one or more methods described or illustrated herein. As an example and not by way of limitation, one or more controllers 218 may perform in real time or in batch mode one or more steps of one or more methods described or illustrated herein. One or more controllers 218 may perform at different times or at different locations one or more steps of one or more methods described or illustrated herein, where appropriate.

In particular embodiments, controller 218 may include a processor 302, memory 304, storage 306, an input/output (I/O) interface 308, a communication interface 310, and a bus 312. Although this disclosure describes and illustrates a particular controller having a particular number of components in a particular arrangement, this disclosure contemplates any suitable controller having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, controller 218 may load instructions from storage 306 or another source (such as, for example, another controller 218) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to controller 218, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 206. Although this disclosure describes and illustrates particular storage, this disclosure contemplates any suitable storage.

In particular embodiments, I/O interface 308 includes hardware, software, or both, providing one or more interfaces for communication between controller 218 and one or more I/O devices. Controller 218 may include one or more of these I/O devices, where appropriate. One or more of these I/O devices may enable communication between a person and controller 218. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between controller 218 and one or more other controllers 218 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, controller 218 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, controller 218 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Controller 218 may include any suitable communication interface 310 for any of these networks, where appropriate. Communication interface 310 may include one or more communication interfaces 210, where appropriate. Although this disclosure describes and illustrates a particular communication interface, this disclosure contemplates any suitable communication interface.

In particular embodiments, bus 312 includes hardware, software, or both coupling components of controller 218 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 4:
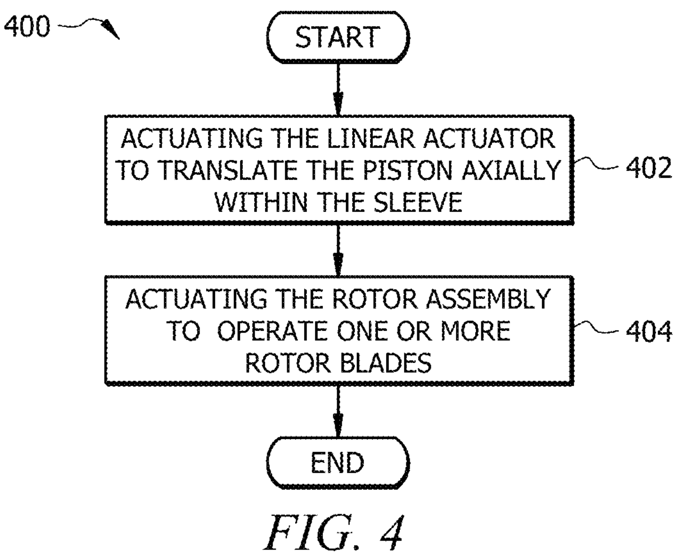
FIG. 4 illustrates an example operation of the example tilt device in FIGS. 2A and 2B, according to certain embodiments.

FIG. 4 is a flowchart of an embodiment of a process 400 for the tilt device 200 (referring to FIGS. 2A-2B). The vehicle 100 (referring to FIG. 1) may employ process 400 for tilting the rotor assembly 110 (referring to FIG. 1) between a first position and a second position so as to adjust the lift and thrust for the vehicle 100. At operation 402, processor 302 (referring to FIG. 4) of the controller 218 (referring to FIG. 4) may transmit an instruction to the tilt device 200 to operate. The transmission may include an instruction to actuate the linear actuator 206 (referring to FIGS. 2A-2B) to translate the piston 210 (referring to FIGS. 2A-2B) within the sleeve 208 (referring to FIGS. 2A-2B). The translation may be from a first position to a second position or alternatively from the second position to the first position. In embodiments, the piston 210 may be coupled to the linear actuator 206 and may be configured to rotate as the piston 210 translates axially along the sleeve 208 via the pin 214 (referring to FIGS. 2A-2B) disposed within the slot 212 (referring to FIGS. 2A-2B) defined in the sleeve 208. In embodiments, movement of the pin 214 is constrained by the slot 212, and the pin 214 extends from the piston 210 and through the slot 212. At least one rotor assembly 110 may be coupled to an end of the piston 210 and is configured to move concurrently with the piston 210. As such, rotation may be imparted onto the at least one rotor assembly 110.

At operation 404, the processor 302 of the controller 218 may transmit an instruction to actuate one or more rotor blades 204 (referring to FIGS. 2A-2B). Operation of the one or more rotor blades 204 may produce a force vector operating on the vehicle 100 to transport the vehicle 100. For example, the controller 218 may be communicatively coupled to the motor 202 (referring to FIGS. 2A-2B) and may instruct the motor 202 to provide the mechanical energy to actuate the one or more rotor blades 204. In embodiments, the timing of executing operation 404 is not limited to after operation 402. For example, operation 404 may occur concurrently with operation 402, before operation 402, or a combination thereof. Once rotor assembly 110 has rotated and the one or more rotor blades 204 are actuated, the process 400 may proceed to end.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order. That is, the steps of any method disclosed herein do not have to be performed in the exact order disclosed, unless explicitly stated.

The present disclosure may provide numerous advantages, such as the various technical advantages that have been described with respective to various embodiments and examples disclosed herein. Other technical advantages will be readily apparent to one skilled in the art from the following figures, descriptions, and claims. Moreover, while specific advantages have been enumerated in this disclosure, various embodiments may include all, some, or none of the enumerated advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An aircraft vehicle, comprising:

a body;

at least one wing coupled to the body;

an aircraft fairing extending from the body;

a first rotor assembly disposed at an end of the aircraft fairing; and a tilt device configured to rotate the first rotor assembly between a first position and a second position, the tilt device comprising:

a linear actuator disposed within the aircraft fairing;

a sleeve having a slot defined therein; and a piston coupled to the linear actuator and configured to translate axially within the sleeve via a pin extending from the piston and through the slot of the sleeve, wherein the piston is further configured to rotate with respect to the sleeve as the pin translates along the slot.

2. The aircraft vehicle of claim 1, wherein the first rotor assembly is coupled to an end of the piston via a mount and is configured to move concurrently with the piston.

3. The aircraft vehicle of claim 2, further comprising a second rotor assembly coupled to the end of the piston through the mount.

4. The aircraft vehicle of claim 1, wherein the slot comprises a helical shape.

5. The aircraft vehicle of claim 1, wherein the first rotor assembly comprises a motor and one or more rotor blades, wherein the motor is configured to actuate the one or more rotor blades.

6. The aircraft vehicle of claim 5, wherein the one or more rotor blades extend outwards in a direction parallel to a horizontal axis when in the first position, and wherein the one or more rotor blades extend outwards in a direction perpendicular to the horizontal axis when in the second position.

7. The aircraft vehicle of claim 1, further comprising:

a second aircraft fairing extending from the body; and a second rotor assembly disposed at an end of the second aircraft fairing.

8. The aircraft vehicle of claim 1, further comprising a controller configured to instruct the linear actuator to extend or to retract.

9. The aircraft vehicle of claim 8, wherein the controller is configured to actuate the tilt device to rotate the first rotor assembly from the first position to the second position and from the second position to the first position.

* * * * *